United States Patent
Shin et al.

(10) Patent No.: US 10,836,337 B2
(45) Date of Patent: Nov. 17, 2020

(54) MULTI-FRONTAL AIRBAG FOR VEHICLE AND AIRBAG DEPLOYMENT SYSTEM USING THE SAME

(71) Applicants: Hyundai Motor Company, Seoul (KR); Kia Motors Corporation, Seoul (KR)

(72) Inventors: Hyo Shub Shin, Seoul (KR); Joo Seon Yoo, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 125 days.

(21) Appl. No.: 16/202,655

(22) Filed: Nov. 28, 2018

(65) Prior Publication Data
US 2020/0122665 A1    Apr. 23, 2020

(30) Foreign Application Priority Data
Oct. 17, 2018 (KR) .......................... 10-2018-0123822

(51) Int. Cl.
*B60R 21/233* (2006.01)
*B60R 21/205* (2011.01)
(Continued)

(52) U.S. Cl.
CPC .. *B60R 21/01554* (2014.10); *B60R 21/01512* (2014.10); *B60R 21/233* (2013.01);
(Continued)

(58) Field of Classification Search
CPC .............................. B60R 21/205; B60R 21/233
See application file for complete search history.

(56) References Cited

U.S. PATENT DOCUMENTS

| | | | | |
|---|---|---|---|---|
| 2,834,606 A | * | 5/1958 | Bertrand | B60R 21/20 280/730.1 |
| 3,642,303 A | * | 2/1972 | Irish | B60R 21/233 280/730.1 |

(Continued)

FOREIGN PATENT DOCUMENTS

| | | |
|---|---|---|
| EP | 1031477 A1 | 8/2000 |
| EP | 1364841 A2 | 11/2003 |

(Continued)

OTHER PUBLICATIONS

Extended European Search Report for European Patent Application No. 18209227, dated Feb. 14, 2019, 8 pages.

*Primary Examiner* — Faye M Fleming
(74) *Attorney, Agent, or Firm* — Mintz Levin Cohn Ferris Glovsky and Popeo, P.C.; Peter F. Corless

(57) ABSTRACT

A multi-frontal airbag for a vehicle and an airbag deployment system using the same are provided. The system includes a sensing unit that collects the state information of a seat. A first airbag module is disposed within the vehicle and includes a first cushion that is deployed toward the front of a passenger and a first inflator that supplies gas to the first cushion. A second airbag module is disposed within a roof above the passenger and includes a second cushion that is deployed downwards and a second inflator that supplies gas to the second cushion. A controller receives the state information of the seat from the sensing unit, and adjusts the operations or operation timings of the first airbag module and the second airbag module.

14 Claims, 7 Drawing Sheets

100(110,120)
200(210,220)
400(410,420)

(51) Int. Cl.
*B60R 21/015* (2006.01)
*B60R 21/2334* (2011.01)
*B60R 21/00* (2006.01)
*B60R 21/01* (2006.01)
*B60R 21/16* (2006.01)

(52) U.S. Cl.
CPC ....... *B60R 21/01504* (2014.10); *B60R 21/205* (2013.01); *B60R 21/2334* (2013.01); *B60R 2021/0004* (2013.01); *B60R 2021/0102* (2013.01); *B60R 2021/01231* (2013.01); *B60R 2021/161* (2013.01)

(56) References Cited

U.S. PATENT DOCUMENTS

| | | | |
|---|---|---|---|
| 6,431,586 B1* | 8/2002 | Eyrainer | B60R 21/213 280/730.1 |
| 7,029,030 B2* | 4/2006 | Amamori | B60R 21/23 280/730.1 |
| 7,040,653 B1 | 5/2006 | Breed | |
| 2019/0299912 A1* | 10/2019 | Tanaka | B60R 21/214 |
| 2019/0381968 A1* | 12/2019 | Kwon | B60R 21/239 |

FOREIGN PATENT DOCUMENTS

| | | | |
|---|---|---|---|
| JP | 2015013518 A | * | 1/2015 |
| JP | 2019172236 A | * | 10/2019 |
| JP | 2019196156 A | * | 11/2019 |
| KR | 101755989 B1 | | 7/2017 |
| KR | 10-2018-0062494 A | | 6/2018 |

* cited by examiner

100(110,120)
200(210,220)

100(110,120)
200(210,220)
300(310,320)

100(110,120)
200(210,220)
400(410,420)

100(110,120)
200(210,220)
400(410,420)

MULTI-FRONTAL AIRBAG FOR VEHICLE AND AIRBAG DEPLOYMENT SYSTEM USING THE SAME

CROSS REFERENCE TO RELATED APPLICATION

The present application claims priority of Korean Patent Application No. 10-2018-0123822 filed on Oct. 17, 2018, the entire contents of which is incorporated herein for all purposes by this reference.

BACKGROUND

Field of the Disclosure

The present disclosure relates to a multi-frontal airbag for a vehicle and an airbag deployment system using the same, and more particularly, to a multi-front airbag that includes a plurality of airbag modules provided at various locations within a vehicle and the location and operation timing of the airbag deployed is adjusted based on the degree of sliding of a seat and the degree of tilting of a seat back, thus safely protecting a passenger.

Description of the Related Art

When a collision is detected through a signal value obtained from various electronic devices such as a collision sensor or an electronic control unit (ECU) within a vehicle, an airbag is rapidly deployed to prevent a passenger from directly colliding with the in-vehicle structures, and absorbs the impact delivered from the outside to prevent the impact from being delivered to the passenger, thus enhancing safety. Generally, a frontal airbag for a vehicle is mounted inside a steering wheel, inside a dashboard (a crash pad), or inside a steering handle of the vehicle.

Specifically, a frontal airbag for a vehicle has been proposed that may prevent a neck injury while the passenger's head directly collides with the in-vehicle structure such as a center fascia or flows along the surface of the airbag in the sloping collision of the vehicle by adjusting the shape of an airbag cushion deployed toward the passenger side with the conventional frontal airbag. However, when the front seat passenger slides a seat in the backward of the vehicle or tilts a seat back to a back seat side, the passenger is slid from the seat to the downward of the dashboard upon collision of the vehicle to collide with the lower surface of the dashboard. In addition, even when the airbag for a passenger seat mounted in the dashboard is deployed, the spacing distance between the passenger and the fully deployed airbag is substantial causing the passenger to directly collide with the in-vehicle structures or the impact delivered from the outside to the passenger is not sufficiently prevented.

The foregoing is intended merely to aid in the understanding of the background of the present disclosure, and is not intended to mean that the present disclosure falls within the purview of the related art that is already known to those skilled in the art.

SUMMARY

The present disclosure provides a multi-frontal airbag for a vehicle and an airbag deployment system using the same, which may include a plurality of airbag modules disposed at various locations in a vehicle for passengers in all the seats, and the location and/or operation timing of the airbag deployed may be adjusted the degree of sliding of the seat and the degree of tilting of the seat back, thus safely protecting the passenger.

For achieving the object, a multi-frontal airbag for a vehicle in accordance with the present disclosure may include a first airbag module disposed within a vehicle, and including a first cushion deployed toward the front of a passenger and a first inflator configured to supply gas to the first cushion; and a second airbag module disposed in a roof above the passenger, and including a second cushion deployed downwards and a second inflator configured to supply gas to the second cushion. The second cushion may be deployed toward a front windshield glass at the roof side above the passenger, and may be the shape inflated toward the front of the passenger in the fully deployed state.

The multi-frontal airbag for the vehicle may further include a third airbag module including a third cushion located on the upper portion of the second cushion in the roof above the passenger and a third inflator configured to supply gas to the third cushion. The third cushion may be supported by the front windshield glass in the deployed state, the second cushion may be supported by the third cushion of the front thereof in the deployed state, and the passenger may be loaded on the second cushion upon collision. The third cushion may be deployed earlier than the second cushion upon collision, and the second cushion may be supported by the third cushion and deployed toward the passenger side.

The second cushion may include a main cushion inflated by receiving the gas from the second inflator and an auxiliary cushion connected to the front portion of the main cushion to communicate to each other via a vent aperture and inflated between the front windshield glass and the main cushion upon deployment. The second airbag module may include an active vent unit configured to adjust the opening and closing of the vent aperture. The active vent unit may include a closing tether for closing the vent aperture by contracting the edge of the vent aperture and a tether cutter for cutting the closing tether to open the vent aperture when the auxiliary cushion is to be deployed.

The multi-frontal airbag for the vehicle may further include a third cushion located at the front windshield glass side rather than the second cushion and a third inflator configured to supply gas to the third cushion. The second cushion and the third cushion may be deployed downwards from the upper portion of the passenger, and the third cushion, the second cushion, and the first cushion may be deployed sequentially when the first cushion to the third cushion are all deployed.

Furthermore, a multi-frontal airbag deployment system for a vehicle in accordance with the present disclosure may include a first airbag module unit disposed within a vehicle, and including a first cushion deployed toward the front of a passenger and a first inflator configured to supply gas to the first cushion; a second airbag module unit located in a roof above the passenger, and including a second cushion deployed downwards and a second inflator configured to supply gas to the second cushion; and a controller configured to execute the operations or adjust operation timings of the first airbag module unit and the second airbag module unit.

The multi-frontal airbag deployment system for the vehicle may further include a third airbag module unit including a third cushion located on the upper portion of the second cushion in the roof above the passenger and a third inflator configured to supply gas to the third cushion. The controller may be configured to receive the state information of the seat, may be provided with a data map regarding the state of the seat, and the state of the seat may be classified into a front mode/a rear mode based on the degree of sliding of the seat cushion and may be classified into a normal mode, a working mode, and a relax mode based on the degree of tilting of the seat back.

The controller may be configured to operate the first airbag module unit to deploy the first cushion when the degree of sliding of the seat cushion is in the front mode and the degree of tilting of the seat back is in the normal mode. The controller may be configured to operate the second airbag module unit to deploy the second cushion when the degree of sliding of the seat cushion is in the rear mode and the degree of tilting of the seat back is in the normal mode. The controller may be configured to operate the second airbag module unit and then operate the first airbag module unit when the degree of sliding of the seat cushion is in the rear mode and the degree of tilting of the seat back is in the working mode.

Additionally, the controller may be configured to operate the third airbag module unit, the second airbag module unit, and the first airbag module unit sequentially when the degree of sliding of the seat cushion is in the front mode or the rear mode and the degree of tilting of the seat back is in the relax mode. The controller may be configured to receive the state information of the passenger seated in the seat, may be provided with the data map regarding the state information of the passenger, and the passenger's state may be classified into a correct posture mode and a seating mode based on the seating posture of the passenger. The controller may be configured to fix the degree of tilting of the seat back to the normal mode to perform a control according to the normal mode when the passenger's state is in the correct posture mode.

The multi-frontal airbag for the vehicle in accordance with the present disclosure may include the plurality of airbag modules disposed at various locations in the vehicle for the passengers of all the seats, and the location and/or operation timing of the airbag deployed may be adjusted based on the degree of sliding of the seat and the degree of tilting of the seat back, thus safely protecting the passenger.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present disclosure will be described in detail with reference to the accompanying drawings, but the present disclosure is not restricted or limited to the exemplary embodiments. For reference, the same numbers in this description denote substantially the same elements, and can be described with reference to the contents described in the other drawings under these rules, and the contents which are determined to be obvious to those skilled in the art or repeated can be omitted.

Figure 1:
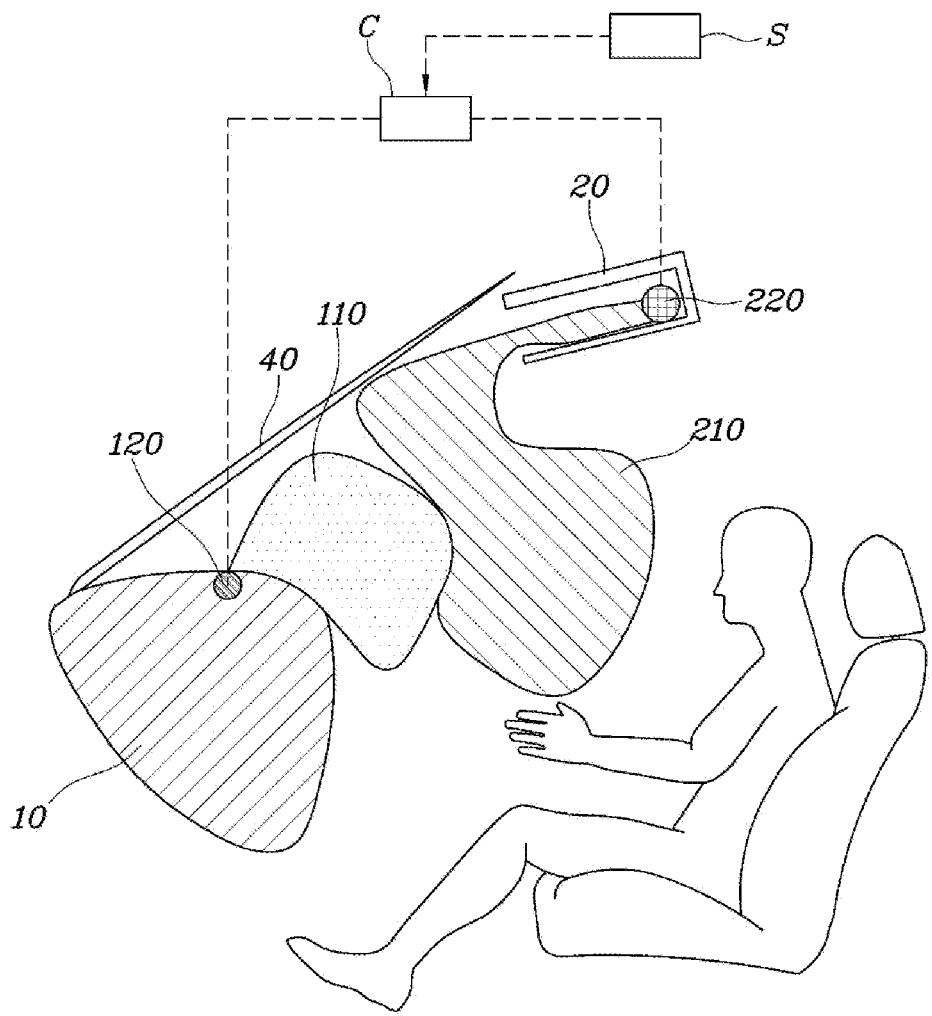
FIGS. 1, 2, 4, 5, and 7 are side cross-sectional diagrams of a multi-frontal airbag for a vehicle in accordance with an exemplary embodiment of the present disclosure.
Figure 2:
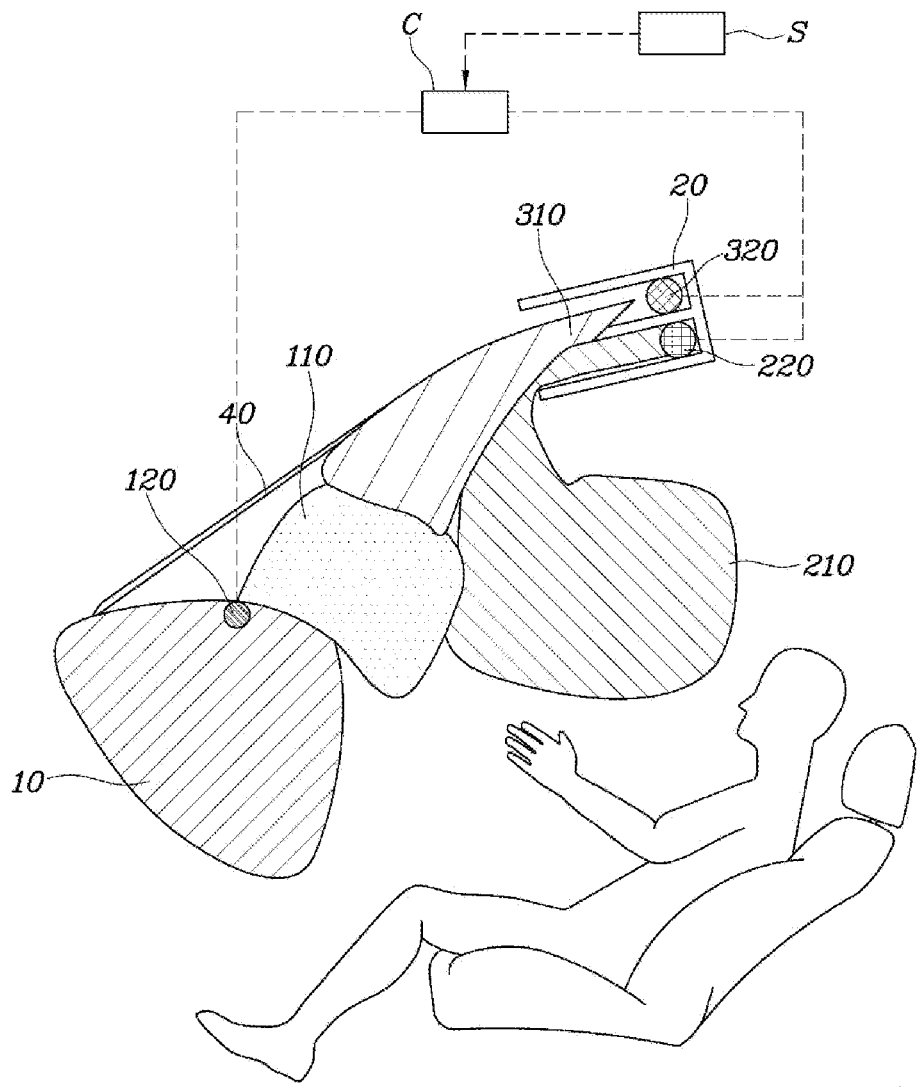
Figure 3:
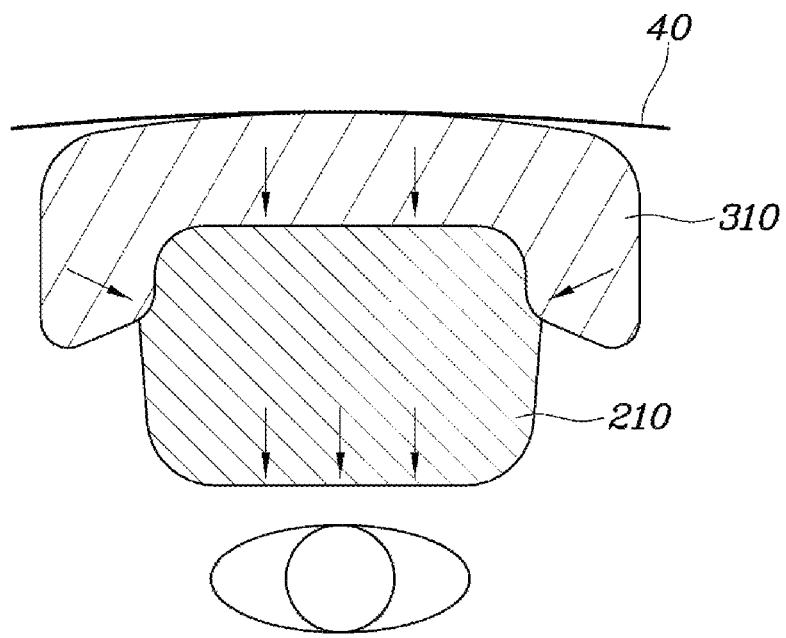
FIGS. 3 and 6 are upper cross-sectional diagrams of the multi-frontal airbag for the vehicle in accordance with an embodiment of the present disclosure.
Figure 4:
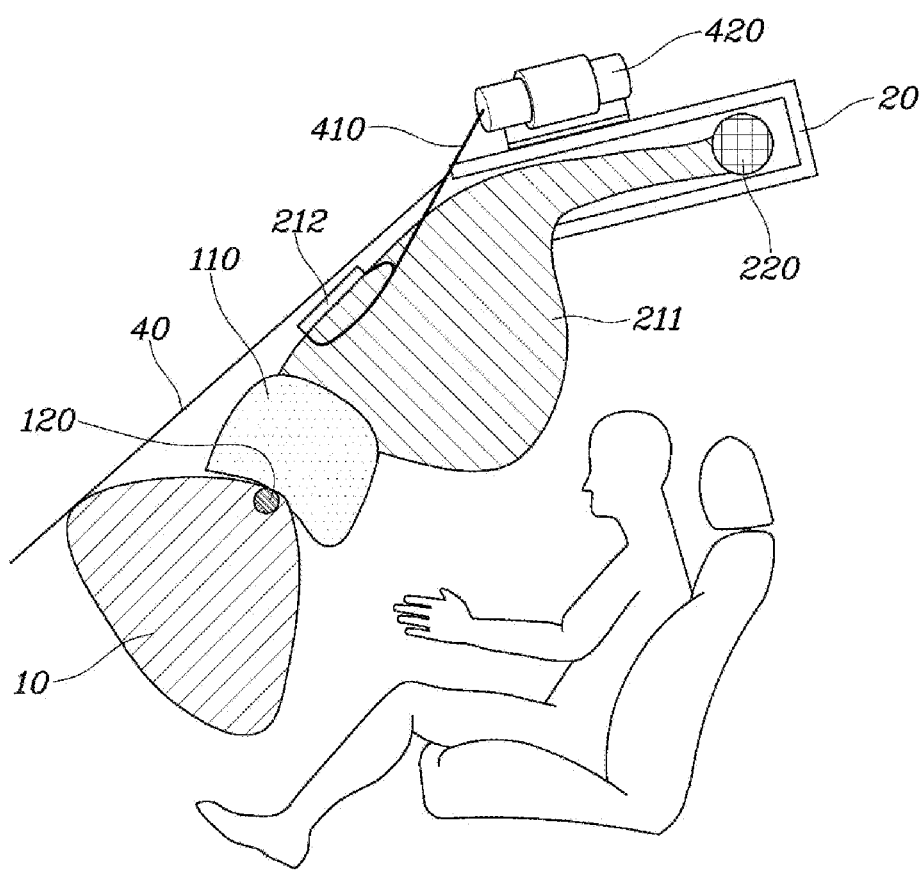
Figure 5:
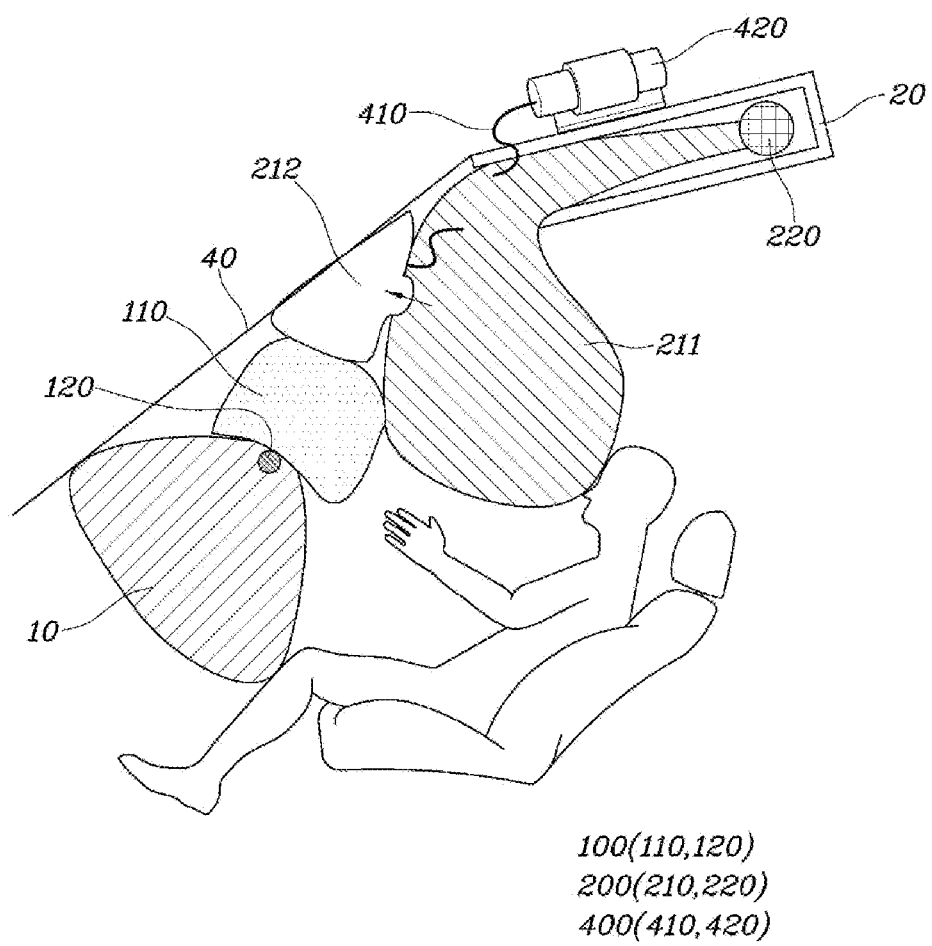
Figure 6:
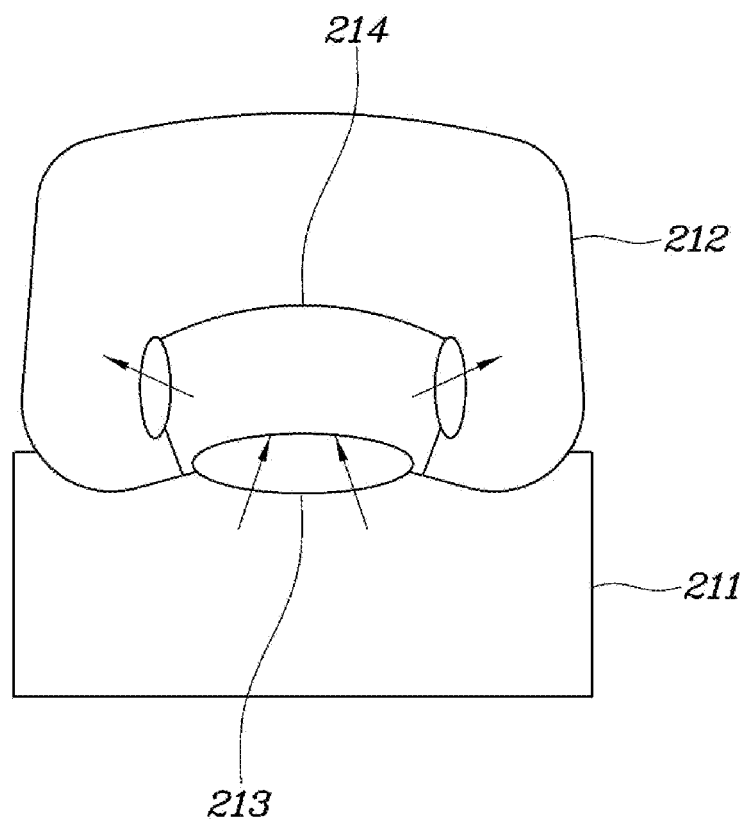

FIGS. 1, 2, 4, 5, and 7 are side cross-sectional diagrams of a multi-frontal airbag for a vehicle in accordance with an exemplary embodiment of the present disclosure, and FIGS. 3 and 6 are upper cross-sectional diagrams of the multi-frontal airbag for the vehicle in accordance with an exemplary embodiment of the present disclosure.

As illustrated in FIG. 1, a multi-frontal airbag for a vehicle in accordance with the present disclosure may include a first airbag module 100 disposed within a vehicle, and including a first cushion 110 deployed toward the front of a passenger and a first inflator 120 configured to supply gas to the first cushion 110; and a second airbag module 200 disposed in a roof 20 above the passenger, and including a second cushion 210 deployed downwards and a second inflator 220 configured to supply gas to the second cushion 210.

Referring to FIG. 1, the first airbag module 100 may include the first cushion 110 and the first inflator 120. For example, the first airbag module 100 may use a general airbag module disposed within a dashboard 10 and may include an airbag cushion deployed toward the front of the passenger and an inflator configured to supply gas to the airbag cushion. In addition, in a self-driving vehicle (e.g., autonomous vehicle), the airbag module may be installed on the rear of a seat back and may be deployed from the front portion of the passenger including the dashboard toward the rear thereof, which is the passenger side. In the following description of the present disclosure, the airbag module is disposed within the dashboard 10 to help understanding of the disclosure.

The first cushion 110 of the present disclosure may be deployed toward the front of the passenger to protect the passenger. In addition, the first cushion 110 may be disposed within the dashboard 10 when not deployed. A first end of the first cushion 110 may be connected to the first inflator 120 to allow the gas generated from the first inflator 120 to be supplied by a controller C to the first cushion 110 upon collision of the vehicle. The first cushion 110 may be inflated by the gas to tear a part of the dashboard 10 and may be deployed toward the front of the passenger. In addition, a tear line for external deployment of the first cushion 110 may be formed in the dashboard 10. The first inflator 120 may be disposed within the dashboard 10 and ignited by the controller C to generate gas, and may be connected to the first cushion 110 to supply the generated gas to the first cushion 110.

Figure 7:
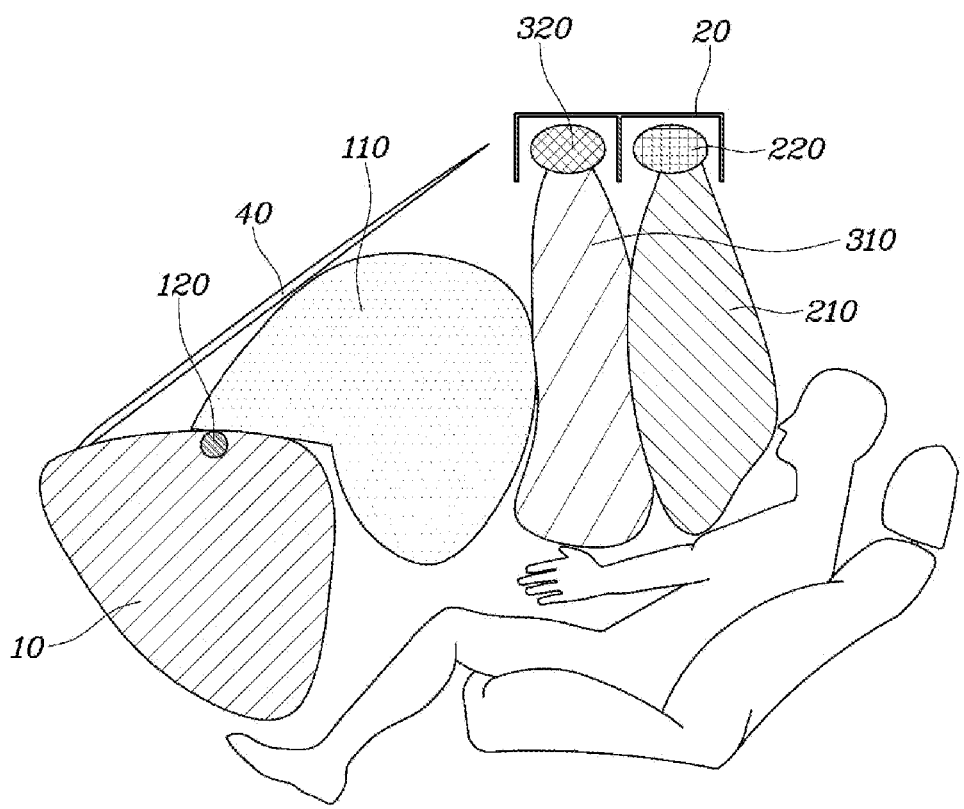

Referring to FIG. 1, the second airbag module 200 may include the second cushion 210 deployed downwards and the second inflator 220 configured to supply gas to the second cushion 210. Referring to FIGS. 1, 4, and 7, the second cushion 210 may be deployed downwards from the roof 20 above the passenger to protect the passenger. In addition, the second cushion 210 may be disposed within the roof 20 above the passenger when not deployed. A first end of the second cushion 210 may be connected to the second inflator 220 to allow the gas generated from the second inflator 220 to be supplied by the controller C to the second cushion 210 upon collision of the vehicle, and the second cushion 210 may be inflated by the gas to tear a part of the roof 20 and deployed downwards. Particularly, the second cushion 210 may be deployed toward a front windshield glass 40 at the roof 20 side above the passenger, and may be the shape that is inflated toward the front of the passenger in the fully-deployed state.

In addition, the multi-frontal airbag for the vehicle may further include a third airbag module 300 including a third cushion 310 disposed the upper portion of the second cushion 210 in the roof 20 above the passenger and a third inflator 320 configured to supply gas to the third cushion 310. The third cushion 310 may be supported by the front windshield glass 40 in the deployed state, the second cushion 210 may be supported by the third cushion 310 of the front thereof in the deployed state, and the passenger may be loaded on the second cushion 210 upon collision.

As shown in FIG. 2, the third cushion 310 may be deployed earlier than the second cushion 210 upon collision of the vehicle and thus, the second cushion 210 may be supported by the third cushion 310 and deployed toward the passenger side. Specifically, in the deployed state, the front of the third cushion 310 may be supported by the front windshield glass 40, and the front and side of the second cushion 210 can may supported by the third cushion 310 to be deployed toward the passenger side. In addition, the first cushion 110, the third cushion 310, and the second cushion 210 may be deployed sequentially upon collision of the vehicle. The lower portion of the third cushion 310 may be supported by the first cushion 110, and the front and side of the second cushion 210 may be supported by the third cushion 310 and supported by the first cushion 110 to be deployed to the passenger side. Referring to FIG. 3, the third cushion 310 may have a shape that protrudes towards the left and right thereof in the deployed state, thus constantly maintaining the deployed shape of the second cushion 210 and effectively protecting the passenger upon offset collision or sloping collision in addition to front collision of the vehicle.

Moreover, as illustrated in FIGS. 4 to 6, the second cushion 210 may include a main cushion 211 inflated by receiving gas from the second inflator 220, and an auxiliary cushion 212 connected to the front portion of the main cushion 211 to be in communication with each other through a vent aperture 213 and may be inflated between the front windshield glass 40 and the main cushion 211 upon deployment. In particular, the auxiliary cushion 212 may be connected to the main cushion 211 to be in communication with each other through the vent aperture 213, and the gas supplied from the second inflator 220 to the main cushion 211 may be supplied to the auxiliary cushion 212 through the vent aperture 213 to allow the auxiliary cushion 212 to be deployed to the front windshield glass 40 side.

In addition, the auxiliary cushion 212 may be inflated between the front windshield glass 40 and the main cushion 211 upon deployment to support the front thereof by the front windshield glass 40 upon collision of the vehicle, thus preventing the shape of the main cushion 211 from being changed. The second airbag module 200 may include an active vent unit 400 configured to adjust the opening and closing of the vent aperture 213. Specifically, the active vent unit 400 may include a closing tether 410 for closing the vent aperture 213 by contracting (e.g., pursing) the edge of the vent aperture 213 and a tether cutter 420 for cutting the closing tether 410 to open the vent aperture 213 when the auxiliary cushion 212 is to be deployed.

Referring to FIG. 4, a first end portion of the closing tether 410 may be fixed to the edge of the vent aperture 213 to adjust the opening and closing of the vent aperture 213, and a second end portion of the closing tether 410 may be fixed to the tether cutter 420. In addition, the deployment of the auxiliary cushion 212 may be adjusted by the opening and closing of the vent aperture 213, and the opening and closing of the vent aperture 213 may be adjusted by the controller C based on the speed and acceleration of the vehicle, and the state of the seat upon collision of the vehicle. For example, when the seat is slid toward the rear of the vehicle and the seat back is tilted toward the back seat side thereof upon collision of the vehicle, the tether cutter 420 may cut the closing tether 410 to open the vent aperture 213 and thus, the auxiliary cushion 212 may be deployed, and the firstly deployed main cushion 211 may be moved to the passenger side by the deployment of the auxiliary cushion 212.

Referring to FIG. 6, the vent aperture 213 may include a diffuser 214, as a flow path connected to the main cushion 211 and supplying gas to the auxiliary cushion 212, in which a plurality of openings through which gas is injected may be formed at the auxiliary cushion 212 side. In particular, at least a portion of the diffuser 214 may be disposed within the auxiliary cushion 212, and may be formed with an opening that is connected to the vent aperture 213 of the main cushion 211 to discharge gas to the auxiliary cushion 212 side. The opening of the diffuser 130 may be formed in plural at the auxiliary cushion 212 side, and as a result, the supplied gas may be supplied more uniformly without being deflected to one side. Accordingly, the auxiliary cushion 212 may be inflated evenly toward the front windshield glass 40 side. The diffuser 214 may be configured to evenly distribute the gas and prevent the gas from flowing back to the main cushion 211 side.

Furthermore, in another exemplary embodiment, as illustrated in FIG. 7, the second airbag module 200 may further include a third cushion 310 disposed at the front windshield glass 40 side rather than the second cushion 210 and a third inflator 320 configured to supply gas to the third cushion 310. Specifically, the second cushion 210 and the third cushion 310 may be deployed downwards from the upper portion of the passenger, and when the first cushion 110 to the third cushion 310 are all deployed, the first cushion 110, the third cushion 310, and the second cushion 210 may be deployed sequentially.

For example, when the first cushion 110 to the third cushion 310 are all deployed, the first cushion 110 may be deployed toward the front of the passenger, the rear surface of the third cushion 310 may be deployed downwards from the upper portion of the passenger while being supported by the first cushion 110, and the rear surface of the second cushion 210 may be deployed downwards from the upper portion of the passenger while being supported by the third cushion 310. For example, when the seat is slid toward the rear of the vehicle and the seat back is tilted toward the back seat side, the first cushion 110 to the third cushion 310 may all be deployed upon collision of the vehicle and the first cushion 110, the third cushion 310, and the second cushion 210 may be deployed sequentially, such that the second cushion 210 may effectively protect the passenger.

Hereinafter, the deployment control of the multi-frontal airbag for the vehicle in accordance with the present disclosure will be described. As illustrated in FIGS. 1 to 7, a multi-frontal airbag deployment system for a vehicle in accordance with the present disclosure may include a first airbag module unit 100 disposed within the dashboard 10, and including the first cushion 110 deployed toward the front of the passenger and the first inflator 120 configured to supply gas to the first cushion 110; a second airbag module unit 200 disposed within the roof above the passenger, and including the second cushion 210 deployed downwards and the second inflator 220 configured to supply gas to the second cushion 210; and a controller C configured to execute the operation or adjust the operation timing of the first airbag module unit 100 and the second airbag module unit 200. Herein, the controller C may be configured to receive the state information regarding the seat and the state information of the passenger from a sensing unit S. The sensing unit S may be configured to confirm the passenger's location, or confirm the angle of the seat back and the sliding location of the seat using an in-vehicle camera or other imaging device, a seat pressure sensor, a passenger weight detection sensor, an ultrasonic, a seat sensor, etc.

Meanwhile, each of the first airbag module unit 100 and the second airbag module unit 200 may be the same as the first airbag module 100 and the second airbag module 200 defined in the multi-frontal airbag for the vehicle. In addition, the multi-frontal airbag deployment system for the vehicle may further include a third airbag module unit 300 that is the same as the third airbag module 300 defined in the multi-frontal airbag for the vehicle.

Furthermore, the controller C of the present disclosure may be configured to receive the state information of the seat, may be provided with a data map on the state of the seat, and the state of the seat may be classified into a front mode and a rear mode based on the degree of sliding of the seat cushion and may be classified into a normal mode, a working mode, and a relax mode based on the degree of tilting of the seat back. The front mode in the state of the seat is a state in which the seat cushion is moved toward the front side of the vehicle, the rear mode is moved to the rear side of the vehicle, and these modes may be preset in a range in which the passenger is protected according to the location of the seat cushion when the cushion is deployed. In addition, the normal mode in the state of the seat may be a state in which the angle of the seat back is adjusted toward the front of the vehicle so that the passenger is seated in a driving posture or a correct posture, the working mode may be a state in which the angle of the seat back is adjusted to the rear further than the normal mode, and the relax mode may be a state in which the angle of the seat back is adjusted to the rear further than the working mode and the passenger is seated in the lying posture. Various modes based on the degree of tilting of the seat back may be preset in a range in which the passenger is protected according to the angle of the seat back.

Specifically, when the degree of sliding of the seat cushion is in the front mode and the degree of tilting of the seat back is in the normal mode, the controller C may be configured to operate the first airbag module unit 100 to deploy the first cushion 110. In other words, when the state of the seat is in the front mode and the normal mode, the passenger seated on the seat is located close to the dashboard 10, which is the front side of the vehicle, to operate only the first airbag module unit 100 to deploy the first cushion 110. As a result, it may be possible to deploy only the first cushion 110 to protect the passenger, thus rapidly protecting the passenger and preventing the passenger from being injured by the excessive inflated force.

Meanwhile, when the degree of sliding of the seat cushion is in the rear mode and the degree of tilting of the seat back is in the normal mode, the controller C may be configured to operate the second airbag module unit 200 to deploy the second cushion 210. In other words, when the state of the seat is in the rear mode and the normal mode, the passenger seated on the seat is relatively further spaced apart from the dashboard 10, which is the front side of the vehicle, to operate only the second airbag module unit 200 to deploy the second cushion 210. As a result, even when the passenger is spaced apart from the dashboard 10, the second cushion 210 deployed at the front windshield glass 40 may be rapidly deployed to the passenger side, thus stably protecting the passenger.

Meanwhile, when the state of the seat is in the rear mode and the degree of tilting of the seat back is in the working mode, the controller C may be configured to operate the second airbag module unit 200 and then operate the first airbag module unit 100. In other words, when the state of the seat is in the rear mode and the working mode, the seat cushion is slid rearwards, and the angle of the seat back is further tilted rearwards, such that the passenger is located to be further spaced apart from the dashboard 10 side. Accordingly, the controller C may be configured to operate the first airbag module unit 100 to deploy the first cushion 110 while operating the second airbag module unit 200 to deploy the second cushion 210, such that the second cushion 210 deployed at the front windshield glass 40 is supported by the first cushion 110 toward the passenger side, thus stably protecting the passenger by the second cushion 210.

Meanwhile, when the degree of sliding of the seat cushion is in the front mode or the rear mode and the degree of tilting of the seat back is in the relax mode, the controller C may be configured to operate the third airbag module unit 300, the second airbag module unit 200, and the first airbag module unit 100 sequentially. As described above, when the state of the seat is in the rear mode and the relax mode, the seat cushion is slid rearwards and the angle of the seat back is completely tilted toward the most rear thereof, such that the passenger is located in the lying posture. Accordingly, the controller C may be configured to operate the second airbag module unit 200 to deploy the second cushion 210 while operating the third airbag module unit 300 to deploy the third cushion 310 and thus, the second cushion 210 may be supported by the third cushion 310 toward the passenger side. In this state, the controller C may be configured to operate the first airbag module unit 100 to deploy the first cushion 110 to induce the second cushion 210 to be deployed toward the passenger side by the first cushion 110, thus stably protecting the passenger who is in the lying posture by the second cushion 210.

Meanwhile, the controller C may be configured to receive the state information of the passenger seated on the seat, may be provided with the data map on the state information regarding the passenger, and the passenger's state may be classified into a correct posture mode and a seating mode based on the seating posture of the passenger. In particular, the controller C may be configured to receive the state information of the passenger using a vision sensor. The correct posture mode is a state in which the passenger is in a driving posture or a correct posture regardless of the angle of the seat back, and the seating mode is a state in which the passenger is seated in the seat according to the angle of the seat back. Accordingly, when the passenger's state is in the correct posture mode, the controller C may be configured to fix the degree of tilting of the seat back to the normal mode to perform a control according to the normal mode.

As described above, when the seating posture of the passenger is in the correct posture mode detected using the sensing unit S, the passenger maintains the seating posture regardless of the location of the seat back, and the controller C may be configured to detect the degree of tilting of the seat back as the normal mode to perform a control according to the normal mode. As a result, even when the state of the seat is in the relax mode, when the passenger's state is in the correct posture mode, the cushion may be deployed based on the control corresponding to the correct posture mode, thus preventing the passenger from being injured by the excessive deployment of the cushion and stably protecting the passenger. The body shape of the passenger may be further classified into an adult mode and a child mode according to the size of the passenger, and a deployment force may be variably controlled by adjusting the amount of gas deployed to the cushion.

Meanwhile, referring to FIGS. 4 to 6, the second cushion 210 may include a main cushion 211 inflated by receiving gas from the second inflator 220 and an auxiliary cushion 212 connected to the front portion of the main cushion 211 to be in communication with each other through the vent aperture 213 and inflated between the front windshield glass 40 and the main cushion 211 upon deployment. The controller C may be configured to operate the second airbag module unit 200 to deploy the second cushion 210 when the degree of tilting of the seat back is in the normal mode or the working mode regardless of the degree of sliding of the seat and the speed or acceleration of the vehicle is a low speed upon collision of the vehicle.

Referring to FIGS. 4 to 6, the second cushion 210 may include the main cushion 211 inflated by receiving gas from the second inflator 220 and the auxiliary cushion 212 connected to the front portion of the main cushion 211 to be in communication with each other through the vent aperture 213 and inflated between the front windshield glass 40 and the main cushion 211 upon deployment. The controller C may be configured to operate the second airbag module unit 200 to deploy the second cushion 210 and then operate the first airbag module unit 100 to deploy the first cushion 110 when the degree of tilting of the seat back is in the normal mode or the working mode and the speed or acceleration of the vehicle is a high speed upon collision of the vehicle.

Referring to FIGS. 4 to 6, the second cushion 210 may include the main cushion 211 inflated by receiving gas from the second inflator 220 and the auxiliary cushion 212 connected to the front portion of the main cushion 211 to be in communication with each other through the vent aperture 213 and inflated between the front windshield glass 40 and the main cushion 211 upon deployment. The controller C may be configured to operate the third airbag module unit 300, the second airbag module unit 200, and the first airbag module unit 100 sequentially to deploy the third cushion 310, the second cushion 210, and the first cushion 110 sequentially when the state of the seat is in the rear mode and the degree of tilting of the seat back is in the relax mode.

Referring to FIG. 7, the third airbag module unit 300 may include the third cushion 310 disposed at the front windshield glass 40 side rather than the second cushion 210 and the third inflator 320 configured to supply gas to the third cushion 310, the second cushion 210 and the third cushion 310 may be deployed downwards from the upper portion of the passenger. The controller C may be configured to operate the first airbag module unit 100 to deploy the first cushion 110 when the state of the seat is in the rear mode and the degree of tilting of the seat back is in the normal mode.

Referring to FIG. 7, the third airbag module unit 300 may include the third cushion 310 disposed on the front windshield glass 40 side rather than the second cushion 210 and the third inflator 320 configured to supply gas to the third cushion 310, the second cushion 210 and the third cushion 310 may be deployed downwards from the upper portion of the passenger. The controller C may be configured to operate the first airbag module unit 100 to deploy the first cushion 110 and then operate the second airbag module unit 200 to deploy the second cushion 210 when the state of the seat is in the rear mode and the degree of tilting of the seat back is in the working mode.

Referring to FIG. 7, the third airbag module unit 300 may include the third cushion 310 disposed on the front windshield glass 40 side rather than the second cushion 210 and the third inflator 320 configured to supply gas to the third cushion 310, the second cushion 210 and the third cushion 310 may be deployed downwards from the upper portion of the passenger. The controller C may be configured to operate the third airbag module unit 300, the second airbag module unit 200, and the first airbag module unit 100 sequentially to deploy the third cushion 310, the second cushion 210, and the first cushion 110 sequentially when the state of the seat is in the rear mode and the degree of tilting of the seat back is in the relax mode.

The multi-frontal airbag for the vehicle in accordance with the present disclosure may include the plurality of airbag modules disposed at various locations within the vehicle for the passengers of all the seats, and the location and/or operation timing of the airbag deployed may be adjusted based on the degree of sliding of the seat and the degree of tilting of the seat back, thus safely protecting the passenger.

What is claimed is:
1. A multi-frontal airbag for a vehicle, comprising:
a first airbag module disposed within the vehicle and including a first cushion deployed toward the front of a passenger and a first inflator configured to supply gas to the first cushion; and
a second airbag module disposed within a roof above the passenger and including a second cushion deployed downwards and a second inflator configured to supply gas to the second cushion,
wherein the second cushion includes a main cushion inflated by receiving gas from the second inflator and an auxiliary cushion connected to the front portion of the main cushion to be in communication with each other through a vent aperture and inflated between a front windshield glass and the main cushion upon deployment, wherein the second airbag module includes an active vent unit configured to adjust the opening and closing of the vent aperture, and wherein the active vent unit includes a closing tether for closing the vent aperture by compressing the edge of the vent aperture and a tether cutter for cutting the closing tether to open the vent aperture when the auxiliary cushion is to be deployed.

2. The multi-frontal airbag for the vehicle according to claim 1, wherein the second cushion is deployed toward a front windshield glass at the roof side above the passenger, and is a shape that is inflated toward the front of the passenger in a fully deployed state.

3. The multi-frontal airbag for the vehicle according to claim 2, further comprising:
a third airbag module including a third cushion disposed on the upper portion of the second cushion in the roof above the passenger and a third inflator configured to supply gas to the third cushion.

4. The multi-frontal airbag for the vehicle according to claim 3, wherein the third cushion is supported by the front windshield glass in a deployed state, the second cushion is supported by the third cushion of the front thereof in the deployed state, and the passenger is loaded on the second cushion upon collision.

5. The multi-frontal airbag for the vehicle according to claim 4, wherein the third cushion is deployed earlier than the second cushion upon collision of the vehicle and the second cushion is supported by the third cushion and deployed toward the passenger side.

6. The multi-frontal airbag for the vehicle according to claim 1, further comprising:
a third cushion disposed at a front windshield glass side and a third inflator configured to supply gas to the third cushion.

7. The multi-frontal airbag for the vehicle according to claim 6, wherein the second cushion and the third cushion are deployed downwards from the upper portion of the passenger, and the third cushion, the second cushion, and the first cushion are deployed sequentially when the first cushion to the third cushion are all deployed.

8. A multi-frontal airbag deployment system for a vehicle, comprising:
a first airbag module unit disposed within the vehicle and including a first cushion deployed toward the front of a passenger and a first inflator configured to supply gas to the first cushion;
a second airbag module unit disposed within a roof above the passenger and including a second cushion deployed downwards and a second inflator configured to supply gas to the second cushion;
a third airbag module unit including a third cushion disposed on the upper portion of the second cushion in the roof above the passenger and a third inflator configured to supply gas to the third cushion; and
a controller configured to execute the operations or adjust operation timings of the first airbag module unit and the second airbag module unit,
wherein the controller is configured to receive state information of a seat, is provided with a data map regarding the state of the seat, and the state of the seat is classified into a front mode and a rear mode based on a degree of sliding of a seat cushion and is classified into a normal mode, a working mode, and a relax mode based on a degree of tilting of a seat back.

9. The multi-frontal airbag deployment system for the vehicle according to claim 8, wherein the controller is configured to operate the first airbag module unit to deploy the first cushion when the degree of sliding of the seat cushion is in the front mode and the degree of tilting of the seat back is in the normal mode.

10. The multi-frontal airbag deployment system for the vehicle according to claim 8, wherein the controller is configured to operate the second airbag module unit to deploy the second cushion when the degree of sliding of the seat cushion is in the rear mode and the degree of tilting of the seat back is in the normal mode.

11. The multi-frontal airbag deployment system for the vehicle according to claim 8, wherein the controller is configured to operate the second airbag module unit and then operate the first airbag module unit when the degree of sliding of the seat cushion is in the rear mode and the degree of tilting of the seat back is in the working mode.

12. The multi-frontal airbag deployment system for the vehicle according to claim 8, wherein the controller is configured to operate the third airbag module unit, the second airbag module unit, and the first airbag module unit sequentially when the degree of sliding of the seat cushion is in the front mode or the rear mode and the degree of tilting of the seat back is in the relax mode.

13. The multi-frontal airbag deployment system for the vehicle according to claim 8, wherein the controller is configured to receive the state information of a passenger seated in the seat, is provided with the data map regarding the state information of the passenger, and the passenger's state is classified into a correct posture mode and a seating mode based on a seating posture of the passenger.

14. The multi-frontal airbag deployment system for the vehicle according to claim 13, wherein the controller is configured to fix the degree of tilting of the seat back to the normal mode to perform a control according to the normal mode when the passenger's state is in the correct posture mode.

* * * * *